Aug. 30, 1955     J. L. H. CHASE     2,716,574
HORTICULTURAL IRRIGATION APPARATUS
Filed July 9, 1954

Inventor
JOCELYN L. H. CHASE
By
Semmes & Semmes
Attorneys

United States Patent Office 2,716,574
Patented Aug. 30, 1955

2,716,574

HORTICULTURAL IRRIGATION APPARATUS

Jocelyn L. H. Chase, Shepperton, England, assignor to Chase Protected Cultivation Limited, Shepperton, England Application July 9, 1954, Serial No. 442,414

Claims priority, application Great Britain July 17, 1953

8 Claims. (Cl. 299—106)

This invention relates to horticultural irrigation apparatus of the type in which a tube connected to a liquid supply is provided at intervals along its length with fine orifices, whereby continuous irrigation may be effected by leaving the tube in contact with the ground.

Continuous irrigation has several advantages:

(a) Only a low-pressure supply is necessary.

(b) The surface of the soil does not become caked, and the water continuously seeps down to the roots of plants.

(c) Splashing of leaves—likely to lead to burning under hot sunshine—does not arise, as is the case with sprinkler irrigation.

On the other hand, it is difficult to regulate the rate of flow, even with low-pressure supply, since very small holes are readily clogged, and holes large enough to avoid clogging result in a flow that is too rapid for most purposes.

The object of the invention is to overcome this difficulty, and, according to the present invention, a flexible tube of rubber or like plastic material adapted for continuous irrigation has holes at intervals along its length, each hole being fitted with a double-headed stud, of which one (inner) head is approximately spherical to allow of insertion in and retention by the hole, and the other (outer) head is generally flat to fit against the outside of the tube, there being a lengthwise hole through the stud to the outer face of the outer head for the seepage of water from the tube.

The seepage hole emerges into the outer head with a diameter suitable for metering the flow required; but the major length of the hole is preferably of increased diameter, say $\frac{1}{16}''$. This may leave say $\frac{1}{8}''$ length of small diameter to provide a steady trickle of liquid through each hole to the soil, in amount in accordance with the pressure of the supply, which may be quite low.

The waist formed between the two heads of the stud is made larger in diameter than the hole to make a watertight seal at this point.

Advantageously, the size of the inner head is such that the seepage hole emerges from it approximately at the centre of the section of the tube to prevent blockage by ingress of fine particles introduced into the tube with the fluid or otherwise, as such particles tend to fall to the bottom of the tube. Therefore, no matter what the disposition of the studs may be as the tube lies on the ground, the seepage holes remain clear from any dirt particles lying on the bottom of the tube.

The invention will now be described in greater detail with reference to the accompanying drawings, in which.

Figure 1:
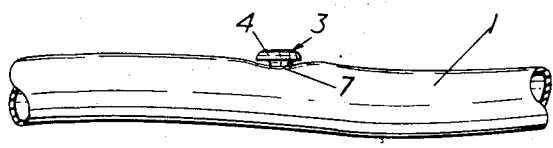
Figure 1 is an elevation of a length of tube including one stud.
Figure 2:
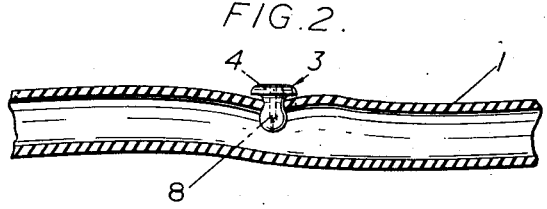
Figure 2 is a longitudinal section of the length of tube corresponding to Figure 1.
Figure 3:
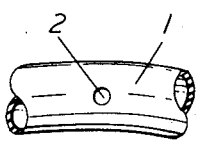
Figure 3 is a fragmentary plan showing the stud removed.
Figure 4:
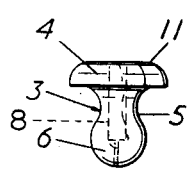
Figure 4 is an elevation of a stud, to a large scale.
Figure 5:
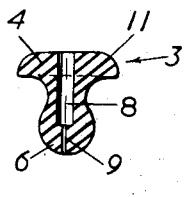
Figure 5 is a vertical section corresponding to Figure 4.

In Figures 1 to 3, a tube 1 is pierced with a small hole 2 to receive and locate a stud 3. As shown more clearly in Figures 4 and 5, the outer head 4 of the stud 3 is circular, and of a diameter substantially in excess of the waist 5 between the outer head and the inner head 6. The inner head is generally spherical, and of a diameter between those of the outer head 4 and the waist 5, and the diameter of the waist is slightly greater than that of the hole 2. The head 6 may be readily forced through the holes 2, and the resiliency of the material (e. g. rubber or polyvinyl chloride) of the tube 1 causes the stud to be gripped at its waist 5, with the inner surface of the head 4 fitting fairly close to the outside of the tube, which tends to flatten somewhat, as indicated at 7. The gripping of the tube round the waist effectively seals the stud into the tube.

A hole 8 is formed through the head 4 and waist 5, ending in the head 6, from which end a much finer bore 9 continues through the head 6. The stud 3 may be a plastic moulding, e. g. of polythene, and the hole 9 may then be formed by piercing with a needle of suitable diameter.

The hole 9 meters the flow of liquid through the stud 3, and, emerging inside the tube 1, is protected against blockage by fine soil particles. The larger hole 8, from which liquid leaves the stud, is not readily prone to blockage, and any particles that may enter it tend to be removed by the outward flow of liquid.

Figure 6:
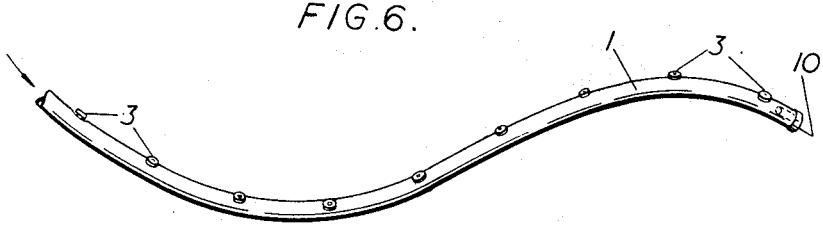
Figure 6 shows to a smaller scale, a length of tube including several studs.

The studs 3 are provided at intervals along the length of the tube 1, as shown in Figure 6, and the far end of the tube is closed in any suitable manner, e. g. by a plug 10. Since there is a progressive pressure drop along the length of the tube from the stud that is nearest the connection to the pressure supply to the stud that is nearest the closed end, the holes 9 may be progressively larger the nearer the studs are to the closed end, to obtain more nearly equal flow from each stud. It is found that a range of sizes from 0.025" to 0.030" diameter is suitable. Near the supply end there may be a number of studs all with 0.025" diameter for their holes 9, then a number of slightly larger diameter, and so on until those studs near the far end have holes of 0.030" diameter.

The holes 9 when pierced in plastic studs tend to shrink, and the piercing needles should be in the range 0.030" to 0.050" diameter to give the required final hole diameters.

Plastic studs do not corrode, and their production by moulding and piercing is more convenient and economic than the production of metal studs. Nevertheless, the use of non-corrodible metals such as brass is not precluded.

The outer head 4 of the stud lies close to the tube 1. Its corners 11 are preferably rounded, so as to make the external surface somewhat convex, to minimize projection from the tube, which may then be drawn over the soil with little danger of detachment of the stud, or of interference to the movement of the tube among the plants to be irrigated. Again, the tube may be readily coiled and uncoiled, complete with studs. When unrolled, the tube should be sufficiently pliant to remain where placed in relation to the plants for the studs to apply their metered flow of liquid in the required positions.

What I claim is:

1. A flexible tube for use in continuous horticultural irrigation, the tube having holes at intervals along its length, and a double headed stud fitted into each of the holes, each stud having an approximately spherical inner head, extending a substantial distance into the bore of the tube, a generally flat outer head, a waist between the inner and outer heads and making sealing engagement with the hole in the tube, the stud being formed with a through axial passage consisting of a fine metering hole in the inner head leading into a seepage hole of larger diameter emerging in the outer head.

2. A flexible tube as in claim 1, wherein the seepage hole joins the metering hole within the inner head.

3. A flexible tube as in claim 2, wherein the metering holes in successive studs along the length of the tube are of progressively increasing diameter.

4. A stud for use with a flexible tube for continuous horticultural irrigation, comprising an approximately spherical inner head, a generally flat outer head, a waist between the inner and outer heads and adapted to make sealing engagement when inserted into a hole in the tube, and a through axial passage consisting of a fine metering hole in the inner head leading to a seepage hole of larger diameter emerging in the outer head.

5. A stud as in claim 4, wherein the seepage hole joins the metering hole within the inner head.

6. A stud as in claim 5, wherein the diameter of the inner head is greater than that of the waist and less than that of the outer head.

7. A stud as in claim 6, wherein the diameter of the seepage hole is slightly less than that of the waist.

8. A stud as in claim 4 moulded from synthetic plastic material and having its metering hole formed by piercing with a needle of between 0.030" and 0.050" diameter.

References Cited in the file of this patent

UNITED STATES PATENTS

| | | |
|---|---|---|
| 883,527 | De Long | Mar. 31, 1908 |
| 1,104,965 | Coles | July 28, 1914 |
| 2,314,525 | Summers | Mar. 23, 1943 |
| 2,563,300 | Aker | Aug. 7, 1951 |

FOREIGN PATENTS

| | | |
|---|---|---|
| 619,492 | Germany | Oct. 2, 1935 |